(12) United States Patent
Kobayashi

(10) Patent No.: US 9,242,525 B2
(45) Date of Patent: Jan. 26, 2016

(54) ROTATING AIR CONDITIONER AND METHOD

(71) Applicant: Herbert S Kobayashi, Webster, TX (US)

(72) Inventor: Herbert S Kobayashi, Webster, TX (US)

( * ) Notice: Subject to any disclaimer, the term of this patent is extended or adjusted under 35 U.S.C. 154(b) by 179 days.

(21) Appl. No.: 14/041,480

(22) Filed: Sep. 30, 2013

(65) Prior Publication Data

US 2015/0089973 A1   Apr. 2, 2015

(51) Int. Cl.
*F25B 1/00*   (2006.01)
*B60H 1/00*   (2006.01)
*F25B 3/00*   (2006.01)

(52) U.S. Cl.
CPC ... *B60H 1/00* (2013.01); *F25B 3/00* (2013.01)

(58) Field of Classification Search
CPC ............ F25B 1/00; F25B 31/00; F25B 19/00; F25B 1/04; F25B 3/00; F25B 9/004; F25B 39/00
USPC ............... 62/498, 469, 295, 499; 165/86, 181
See application file for complete search history.

(56) References Cited

U.S. PATENT DOCUMENTS

| | | | | |
|---|---|---|---|---|
| 2,697,919 A * | 12/1954 | Raver | ................................ | 62/74 |
| 2,805,558 A * | 9/1957 | Knight | ............................ | 62/499 |
| 2,811,841 A * | 11/1957 | Grimshaw | ...................... | 62/469 |
| 2,924,081 A | 2/1960 | Justice | | |
| 3,025,684 A * | 3/1962 | MClain et al. | .................. | 62/499 |
| 3,852,976 A * | 12/1974 | Hintze | ............................ | 62/499 |
| 3,911,694 A * | 10/1975 | Doerner | ......................... | 62/499 |
| 3,999,400 A | 12/1976 | Gray | | |
| 4,000,778 A * | 1/1977 | Laing | .............................. | 165/86 |
| 4,073,338 A * | 2/1978 | Fujikake et al. | ................ | 165/86 |
| 4,077,230 A * | 3/1978 | Eskeli | ............................. | 62/401 |
| 4,084,408 A * | 4/1978 | von Platen | ...................... | 62/467 |
| 4,124,993 A * | 11/1978 | Eskeli | ............................... | 62/86 |
| 4,131,157 A * | 12/1978 | Laing | .............................. | 165/86 |
| 4,621,684 A * | 11/1986 | Delahunty | ...................... | 165/92 |
| 5,009,085 A * | 4/1991 | Ramshaw et al. | ............... | 62/476 |
| 5,243,836 A * | 9/1993 | Spring | ............................ | 62/499 |
| 5,878,808 A | 3/1999 | Rock et al. | | |
| 6,449,981 B1 | 9/2002 | Ueda et al. | | |
| 6,745,585 B2 | 6/2004 | Kelm et al. | | |
| 7,093,454 B2 * | 8/2006 | Kidwell | .......................... | 62/209 |
| 7,503,383 B2 | 3/2009 | Yamaguchi et al. | | |
| 8,117,930 B2 | 2/2012 | Adams et al. | | |
| 2003/0145621 A1 * | 8/2003 | Kidwell | .......................... | 62/499 |
| 2011/0230389 A1 * | 9/2011 | Masui et al. | ................... | 510/537 |
| 2012/0180992 A1 * | 7/2012 | Koplow | ................... | 165/104.21 |

* cited by examiner

*Primary Examiner* — Mohammad M Ali
(74) *Attorney, Agent, or Firm* — Kenneth L. Nash

(57) ABSTRACT

A rotating air conditioner apparatus and method comprising an elongated shaft, whereby one or more of a condenser coil, an evaporator coil, and a compressor rotate around the elongated shaft. In one embodiment, balancing weights rotate with the shaft and are positioned to prevent uneven rotation of rotating air conditioner during operation. The evaporator and condenser contain a plurality of fins and/or fan blades and coils for refrigerant. Inlets and/or adjustably directed outlets on the evaporator and/or the condenser provide for circulation of air through the rotating air conditioner apparatus.

18 Claims, 8 Drawing Sheets

ROTATING AIR CONDITIONER AND METHOD

BACKGROUND OF THE INVENTION

1. Field of the Invention

The present invention relates generally to air conditioner systems and apparatuses, and more specifically to an electronic rotating air conditioner apparatus.

2. Background of the Invention

There are many different types of air conditioning systems, including through-the wall window-unit systems, split-system central air conditioners, portable air conditioners, automotive air conditioners, and the like. However, all air conditioner systems generally contain four primary components: a motor driven compressor, a condenser, a metering device, and an evaporator. Moreover, virtually all air conditioners are heavy and bulky.

These components work in conjunction to remove heat and humidity from the surrounding air, creating a cooler ambient temperature of the surrounding air. The compressor, driven by the motor, acts to pump refrigerant from the evaporator to the condenser and pressurizes the refrigerant. The condenser turns the refrigerant vapor into a condensed liquid refrigerant by running the vapor through condenser coils, thereby removing any latent heat. The metering device acts to limit the flow of liquid refrigerant to the evaporator, consequently lowering the pressure of the refrigerant. As the low pressure liquid refrigerant enters the evaporator, it absorbs heat and then vaporizes into the evaporator coils. This cycle continues until a thermostat senses that the air temperature is at a desired temperature, and disengages the air conditioner system.

FIG. 3 and FIG. 4 depict diagrams of two common prior art air conditioners systems often encountered. Stationary air conditioner 300 is a general configuration for a window air conditioner. Relay thermostat switch 310 controls compressor motor 312 through electric line 328 and controls fan motor 320 by way of electric line 311. A refrigerant such as Freon flows between evaporator 322 and condenser 316, changing states between gas and liquid. The Freon flows through high pressure lines 314, 318 and low pressure line 324. Evaporator 322 and condenser 316 are stationary. Blower 330 and fan motor 320 circulate the conditioned air as it passes through evaporator 322. Condenser 316 may also comprise a blower and cooling fins.

Air conditioner 400 for use in a vehicle similarly uses stationary evaporator 428 and condenser 420 as depicted in FIG. 4. Relay thermostat switch 410 controls clutch 414 electrically by electric line 411. Power to clutch 414 is provided by pulleys 415, 416 and belt 417 operably connected to a motor in the vehicle. Blower 426 is controlled by electric motor 424, connected to relay thermostat switch 410 by electric line 408. Evaporator 428 and condenser 420 are relatively heavy, increasing the weight of the vehicle.

The following patents discuss background art related to the above discussed subject matter:

U.S. Pat. No. 2,924,081 to Justice, issued Feb. 9, 1960 discloses a rotating air conditioner without internal mechanical parts comprising three concentric rings, or containers, each acting as one of a condenser-compressor, an evaporator, and a reservoir for refrigerant. Interconnecting conduits allow these functions to operate without independent valves or moving parts. Internal power to flow liquid radially outward from the reservoir was furnished by centrifugal force when the entire structure was rotated by a motor or otherwise. The liquid flowed through a conduit into the compressor where it accumulated and pressurized the gas to liquefy. The low pressure caused by the liquid leaving the reservoir was effective through another conduit to draw gas from the evaporator ring or container.

U.S. Pat. No. 3,999,400 to Gray, issued Dec. 28, 1976, discloses a unique rotary hermetic heat pipe is disclosed for transferring heat from an external source to an external heat sink. The heat pipe has a tapered condensing surface which is curved preferably to provide uniform pumping acceleration, the heat pipe being rotated at a velocity such that the component of centrifugal acceleration in an axial direction parallel to the tapered surface is greater than 1G and so that the condensing surface is kept relatively free of liquid at any attitude. The heat pipe may be incorporated in an air conditioning apparatus so that it projects through a small wall opening. In the preferred air conditioning apparatus, a hollow hermetic air impeller is provided which contains a liquefied gaseous refrigerant, such as Freon, and means are provided for compressing the refrigerant in the evaporator region of the heat pipe.

U.S. Pat. No. 5,878,808 to Rock et al., issued Mar. 9, 1999, discloses a rotating heat exchanger. A rotating heat exchanger has a first air turbine connected to a first end of an axle. The second end of the axle is connected to a second air turbine. A heat pipe extends from the first air turbine to the second air turbine, providing for a heat exchanger that does not need external power.

U.S. Pat. No. 6,745,585 to Kelm et al., issued Jun. 8, 2004, discloses an electric air conditioner system. The electric air conditioner system includes a compressor, an engine and an electric motor. The engine and the electric motor selectively rotate the compressor. When the engine is rotating the compressor and the engine stops, the electric motor is synchronously activated to maintain continuous rotation of the compressor.

U.S. Pat. No. 6,449,981 to Ueda et al., issued Sep. 17, 2002, discloses an air passage controlling system for selecting an air outlet mode of an air conditioning apparatus includes a driving shaft, an intermediate shaft, a driven shaft and a film door disposed between the shafts. The film door has a door opening through which air flows, and is disposed inside an air duct to be opposite to a duct opening of the air duct. The duct opening is opened and closed by moving the film door to select an air outlet mode. The driving shaft and the driven shaft are respectively connected to a driving pulley and a driven pulley which are linked via a wire. The driving shaft is rotated by a DC motor, and a rotation angle of the driving shaft is detected by a multi-rotation type potentiometer. The DC motor is controlled by an ECU according to the detected rotation angle of the driving shaft so that the film door is moved to a set position. Thus, due to the potentiometer, a low-priced DC motor is employed for the air passage controlling system instead of a high-priced step motor, resulting in cost reduction of the system.

There exists a need for a more lightweight and compact air conditioner. Consequently, those skilled in the art will appreciate the present invention.

SUMMARY OF THE INVENTION

An object of the present invention is to provide an improved air conditioner system and method.

Another object of the present invention is to provide a more compact and portable air conditioner system and method.

Another object of the present invention is to provide an improved heat exchanger for an improved air conditioner system and method.

Still another object of the present invention is to provide an improved air conditioner system and method that requires fewer ducts to distribute air.

Yet another object of the present invention is to provide a more rugged air conditioner system with less maintenance requirements.

These and other objects, features, and advantages of the present invention will become clear from the figures and description given hereinafter. It is understood that the objects listed above are not all inclusive and are only intended to aid in understanding the present invention, not to limit the bounds of the present invention in any way.

In accordance with one embodiment of the present invention, a rotating air conditioner apparatus may include, but is not limited to, a compressor and an evaporator comprising evaporator coils concentrically mounted to an elongated shaft for rotation, and a condenser comprising condenser coils concentrically mounted to the elongated shaft for rotation around the elongated shaft. The elongated shaft may comprise a dual shaft and/or the shaft and/or portions of the shaft or dual shaft may or may not rotate with the compressor and evaporator, which rotate around the elongated shaft and/or portions of the shaft.

In one embodiment, the evaporator further comprises a cylindrical evaporator housing, an inlet duct, an outlet duct, and an evaporator blower configured around the elongated shaft so that the evaporator blower rotates along around the elongated shaft axis, the evaporator being operably connected by a low pressure line to the compressor.

The condenser blower may further comprise a housing an inlet duct, and an outlet duct, and a condenser blower configured around the elongated shaft so that the condenser blower rotates along with the elongated shaft, whereby the condenser blower creates airflow through the outlet duct, the condenser operably connected to the compressor and the evaporator blower.

In one embodiment, a blower motor rotates with and/or around the elongated shaft and may further comprise a plurality of slip rings for transferring power from the motor to rotate the compressor, the condenser, and the evaporator.

In another embodiment, the motor may further comprise a stationary housing with a direct connection to power the compressor, the condenser, and the evaporator.

The apparatus may further comprising at least two balancing weights placed on opposite sides of the elongated shaft to balance rotational movement of the shaft during operation of the rotating air conditioner, the at least two balancing weights rotating around the elongated shaft.

The rotating air conditioner apparatus may comprise a fluid rotary joint for connecting the compressor with the evaporator and the condenser, the fluid rotary joint comprising a stationary connection on one side and a rotating connection on an opposite side, whereby the rotary joint provides a sealed connection between the compressor with the evaporator and the condenser.

In another embodiment, the rotating air conditioner apparatus may comprise a rotatable elongated shaft further comprising at least one pulley for drive means from an independent motor, a clutch mechanism forming a part of the elongated shaft, an evaporator comprising evaporator coils, a condenser comprising condenser coils, a compressor operable for compressing Freon, and wherein at least one of the evaporator, the condenser, and the compressor are mounted for rotation around the elongated shaft.

The evaporator may further comprise a cylindrical evaporator housing, an inlet duct, and an outlet duct, whereby the evaporator is configured around the elongated shaft so that the evaporator rotates around the elongated shaft axis and a line for Freon between the evaporator and the compressor.

The condenser may further comprise a cylindrical housing, an inlet duct, and an outlet duct, whereby the condenser is configured around the elongated shaft so that the condenser rotates around the elongated shaft, whereby the condenser creates airflow and/or anti-freeze water through the outlet duct, the condenser operably connected to the compressor and the evaporator.

The rotating air conditioner may further comprise an electronic switch to operate the rotating air conditioner, whereby the electronic switch activates the clutch to power the compressor and a motor is operably engaged with the at least one pulley by at least one belt thereby providing power to rotate the elongated shaft, whereby the compressor, the evaporator, and the condenser rotate at the speed of the elongated shaft.

In one embodiment, the apparatus may comprise extendable duct hoses, thereby allowing a user to specify where treated air is deposited after leaving the rotating air conditioner apparatus and where air is brought into the rotating air conditioner apparatus.

In another embodiment of the present invention, a method for a rotating air conditioner apparatus may include, but is not limited to, providing an elongated shaft mounted for rotation, providing a compressor, providing an evaporator comprising evaporator coils concentrically mounted for rotation to the elongated shaft, and providing a condenser comprising condenser coils concentrically mounted for rotation to the elongated shaft.

The method may include providing that the evaporator comprises a cylindrical evaporator housing, an inlet duct, an outlet duct, and an evaporator blower configured around the elongated shaft so that the evaporator blower rotates along with the elongated shaft, the evaporator being operably connected by a low pressure return line to the compressor.

Another step may be providing the condenser comprises housing, an inlet duct, an outlet duct, and a condenser blower configured around the elongated shaft so that the condenser blower rotates along with the elongated shaft, whereby the condenser blower creates airflow through the outlet duct, the condenser operably connected to the compressor and the evaporator blower.

Other steps may include providing a blower motor which rotates with the elongated shaft and a plurality of slip rings for transferring power from the motor to rotate the compressor, the condenser, and the evaporator.

In another embodiment, the method may comprise providing the motor comprises a stationary housing with a direct connection to power the compressor, the condenser, and the evaporator.

The method may further comprise providing at least two balancing weights placed on opposite sides of the elongated shaft to balance rotational movement of the shaft during operation of the rotating air conditioner, the at least two balancing weights rotating along with the elongated shaft.

Another step may include providing a fluid rotary joint for connecting the compressor with the evaporator and the condenser, the rotary joint comprising a stationary connection on one side and a rotating connection on an opposite side, whereby the rotary joint provides a sealed connection between the compressor with the evaporator and the condenser.

BRIEF DESCRIPTION OF THE DRAWINGS

The above general description and the following detailed description are merely illustrative of the generic invention, and additional modes, advantages, and particulars of this invention will be readily suggested to those skilled in the art without departing from the spirit and scope of the invention. A more complete understanding of the invention and many of the attendant advantages thereto will be readily appreciated by reference to the following detailed description when considered in conjunction with the accompanying drawings, wherein like reference numerals refer to like parts and wherein.

DETAILED DESCRIPTION OF THE PREFERRED EMBODIMENT

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
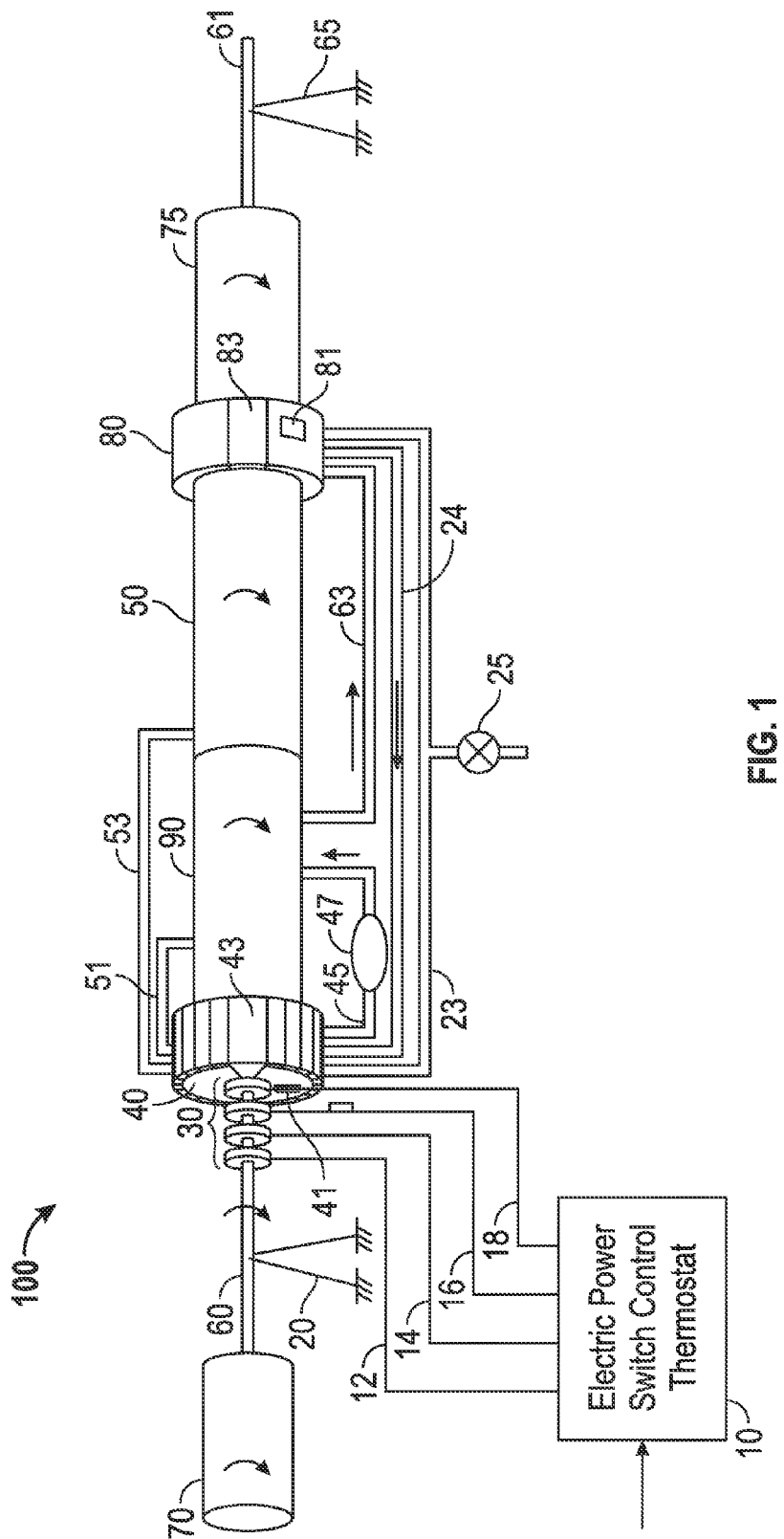
FIG. 1 is a perspective schematic view of a window air conditioner system in accord with one possible embodiment of the present invention.

Turning now to FIG. 1, there is shown a perspective schematic view of rotating air conditioner 100 in accord with one possible embodiment of the present invention. This embodiment may be suitable for window air conditioning applications, as well as other portable arrangements. Air conditioner 100 utilizes shaft 60 to rotate components of air conditioner 100 such as internal components of evaporator 40 and condenser 80 that may be provided within a stationary housing (See FIG. 5 and FIG. 6).

Control box 10 acts as an electrical switch to control various components of rotating air conditioner 100 including, but not limited to, single phase motor and compressor 90 hermetically sealed and blower motor 50, as well as other facets to the present invention, which may also rotate with shaft 60. In this embodiment, blower motor 50 and/or an additional blower may be utilized to rotate fan blades/fins in evaporator 80 and/or condenser 40. Blower motor 50 may comprise an additional shaft such as tubular shaft that rotates around shaft 60.

Shaft 60 and/or shaft end 61 provides a central structure around which the other components of rotating air conditioner 100 are configured. Shaft 60 and end 61 may be continuous or be provided in segments and/or comprise inner and outer shaft components some of which rotate and other parts that do not rotate as discussed hereinafter. In one embodiment, bearing supports 20 carry shaft 60 as shaft 60 rotates during operation, while bearing support 65 can be fixed to shaft 61, which can remains stationary during operation as discussed hereinafter. In another embodiment, bearing support 65 may not be fixed to shaft 61, allowing shaft 61 to rotate along with shaft 60. Compressor 90, evaporator 40 with evaporator coils and evaporator blower, and condenser 80 with condenser coils and condenser blower rotate around shaft 60 driven by blower motor 50 during operation of rotating air conditioner 100. Auto balancers 70, 75 operate to keep compressor 90, evaporator 40, and condenser 80 rotating around shaft 60 of rotating air conditioner 100 and automatically balance the components, if necessary.

Control box 10 is connected to rotating air conditioner components through slip rings 30 and electric lines 12, 14, 16, and 18. Slip rings 30 allows power to be transmitted to the relevant components of rotating air conditioner 100 by electric lines 51 and 53, which power compressor 90 and blower motor 50 respectively, amongst other components. In this embodiment, blower motor 50 is located on shaft 60 at a position offset from or distal to slip rings 30. A rotating blower motor 50 mounted on shaft 60 may be utilized to augment or increase air flow in condenser 80 and/or evaporator 40.

Figure 1A:
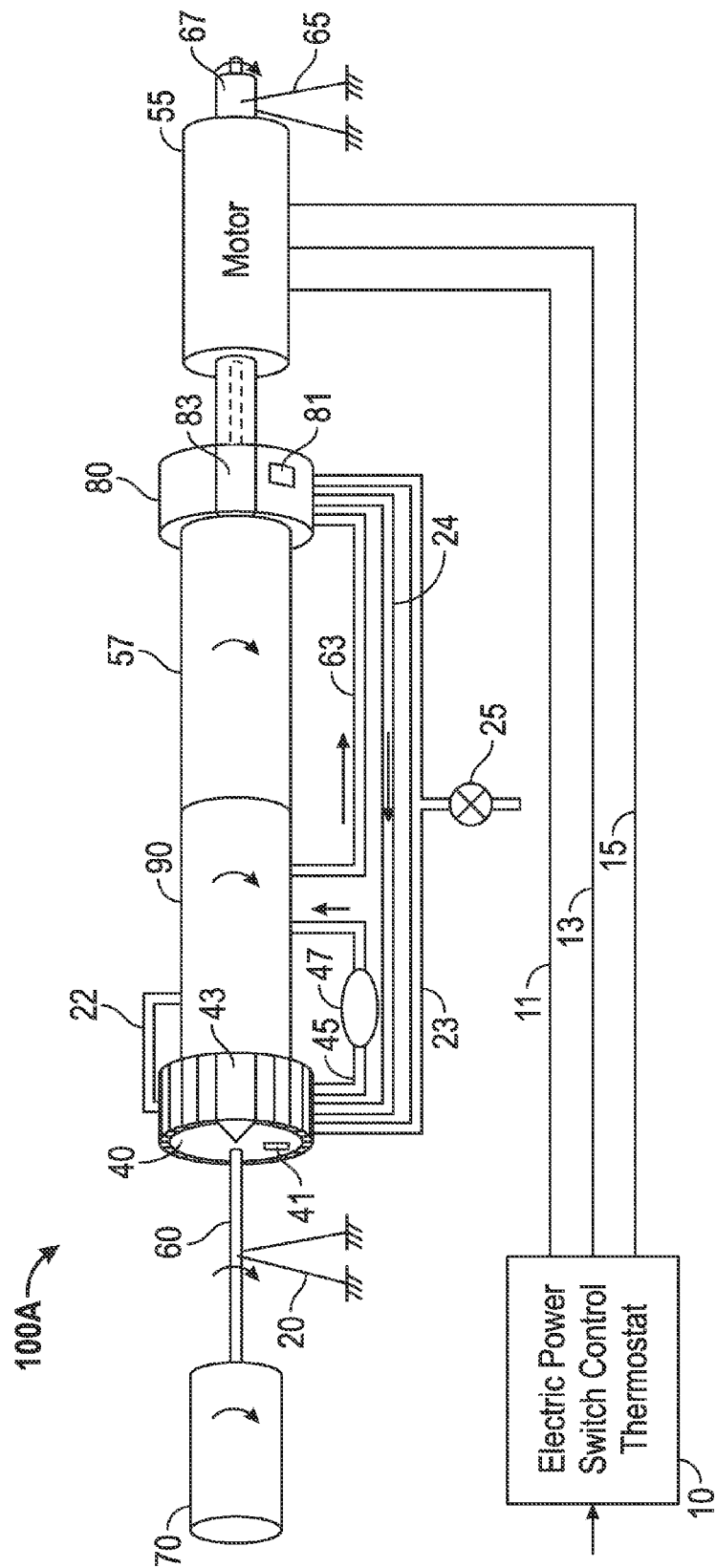
FIG. 1A is another perspective schematic view of another window air conditioner system in accord with one possible embodiment of the present invention.

In another related embodiment, as depicted in FIG. 1A, motor 55 comprises a housing that is fixed in position and a rotor that connects to shaft 67 adjacent to condenser 80. In this embodiment a dual shaft is utilized wherein an outer cylindrical portion of the shaft may be stationary. For example, outer shaft 67 can be stationary and is supported by bearing support 65, while supporting motor or generator 55. In one embodiment, shaft 67 is larger in diameter than shaft 60 and comprises a hollow center portion in which shaft 60 is inserted through, allowing shaft 60 to rotate along with other components of rotating air conditioner 100A during operation. However, it will be appreciated that shaft mountings may involve a rotating shaft and/or non-rotating portions of the shaft whereby the components discussed herein rotate around the shaft axis. In this embodiment, power lines 11, 13, and 15 connect control box 10 with motor 55 without slip rings. Moreover a generator may be provided on the shaft to produce power for the components. Slip rings 30 are only necessary to transfer power from a stationary source to a rotating destination and therefore are removed from the arrangement of rotating air conditioner 100 as depicted in FIG. 1A. In this embodiment, blower 57 operates as an auto-balance device to stabilize rotating air conditioner 100 during operation. Blower 57 also blows air through condenser 80. In one embodiment, blower 57 may be referred to in the art as a "squirrel cage blower." Blower 57 may require slip rings if blower 57 comprises an electric motor.

Referring again to FIG. 1, and to the extent that the numbers are the same, evaporator 40 comprises evaporator coils and cooling fins where liquid Freon is released inside that turns to gas by absorbing the heat present on evaporator coils and evaporating into a gas, as discussed hereinafter in reference to FIG. 5. Evaporator return line 45 returns low pressure Freon gas to compressor 90 to be pressurized and then cooled by condenser 80. Dryer 47 dries and filters the Freon gas inside return line 45 before returning the gas to compressor 90. Inlet duct 41 receives air into evaporator blower 40 at room temperature and outlet ducts 43 forces cool air from evaporator blower 40. The liquid Freon, which flows through the evaporator coils, expands to cause cooling. Condensate line 23 removes condensation created during operation of rotating air conditioner 100 from evaporator 400 to condenser 80. In one embodiment, condensate line 23 may run to drain 25 or another receptacle for removal of excess liquid generated in evaporator 40 during operation.

Both inlet duct 41 and outlet duct 43 are preferably movable to achieve the maximum airflow desired and direct the air to a desired position in the room. The inlet and outlet air ducts are described in more detail with respect to FIGS. 5 and 6 and may comprise a fixed but redirectable housing at least for the outlet duct.

After compressor 90 receives the Freon gas from evaporator 40, hermetically sealed motor and compressor 90 pressurizes the Freon, which causes the Freon to heat up, and then forces pressurized Freon through high pressure line 63. The pressurized, hot Freon is then passed through condenser 80 which further cools the Freon liquid to a low temperature. Condenser 80 comprises condenser coils and cooling fins, to be described hereinafter in reference to FIG. 6, which lowers the temperature of the refrigerant to a cool liquid Freon. Liquid Freon is cooled by the air brought into condenser 80 through moveable inlet 81. Motor blower 50 then expels the hot air through adjustable outlet duct 83. The condensed Freon is then directed back to evaporator 40 through high pressure line 24.

Figure 1B:
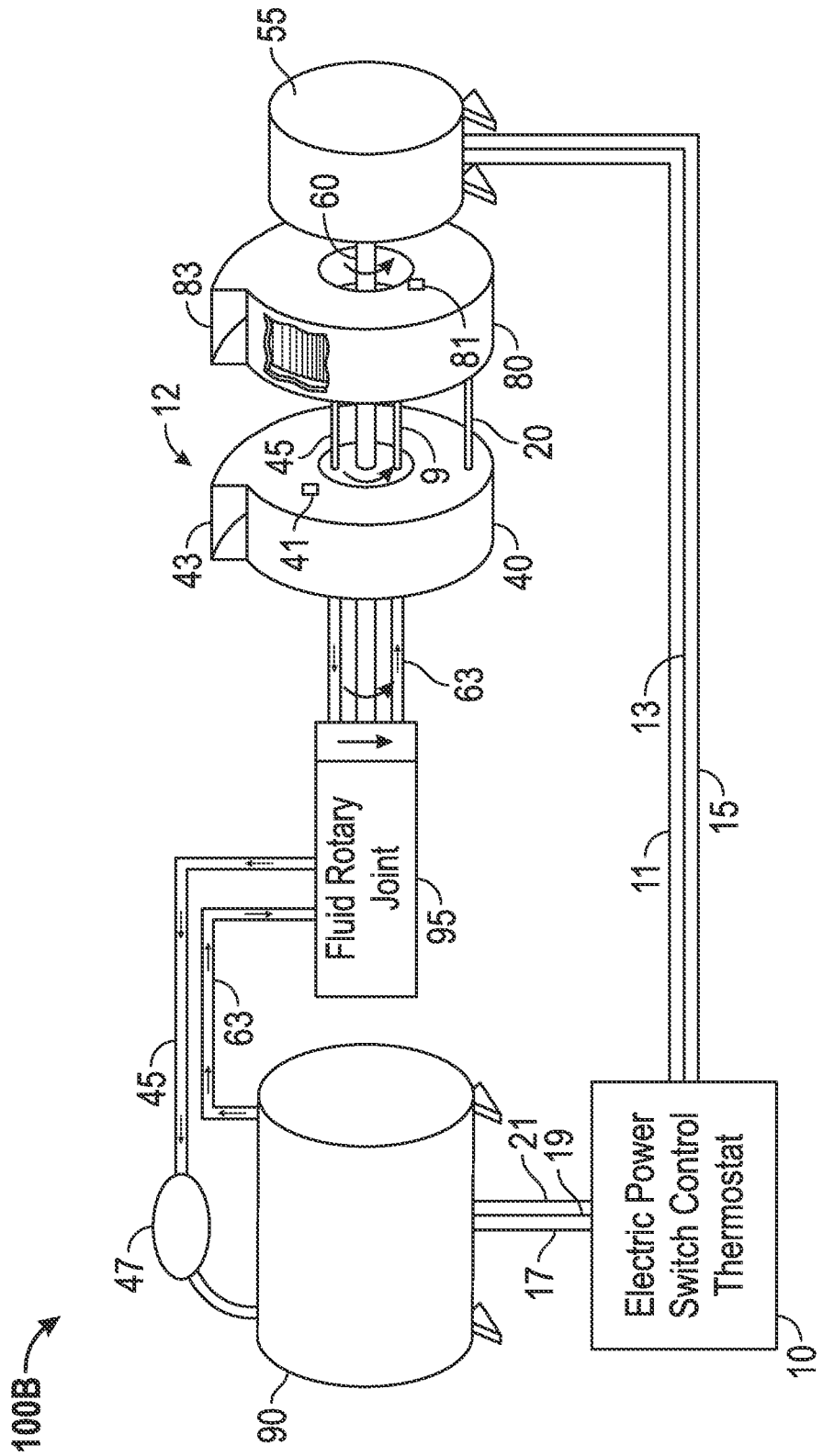
FIG. 1B is yet another perspective schematic view, partially cut away, of a window air conditioner system in accord with one possible embodiment of the present invention.

Turning now to FIG. 1B, another possible embodiment of rotating air conditioner 100 is shown with a fixed position compressor and shaft 60 drive motor 55 as compared with the embodiment of FIG. 1A. As in previous embodiments, air conditioner 100 is controlled through thermostat 10 which is operably connected with a non-rotating compressor 90 by electric lines 17, 19, 21. Thermostat 10 connects to shaft 60 drive motor 55 by electric lines 11, 13, 15. The motor housing of motor 55 and compressor 90 are stationary with respect to Earth in this embodiment of rotating air conditioner 100. Unlike the previous embodiments, shaft 60 is shorter and only accommodates evaporator 40 and condenser 80 around its axis. Fluid rotary joint 95 is coupled with compressor 90 by evaporator return line 45 and high pressure line 63 which runs from condenser 80 to compressor 90 to cool or remove heat from the Freon when pressurized. Evaporator return line 45 further comprises filter 47, which dries and filters the Freon gas as it returns to compressor 90.

Fluid rotary joint 95 rotatably connects fluid line 63 between condenser 80 and compressor 90. Fluid rotary joint 95 rotatably connects low pressure line 45 between evaporator 80 and compressor 90. Essentially, rotary joint 95 allows the rotating parts, namely evaporator 40 and condenser 80 coils and associated refrigerant fluid lines, to have a sealed fluid connection with compressor 90, which is stationary, using a fluid rotary joint mechanism that connects rotating fluid line portions with stationary fluid line portions. Evaporator 40 and condenser 80 can be identical to their counterparts in other figures and their internal components to be discussed in greater detail hereafter in referenced to FIGS. 5 & 6.

Figure 2:
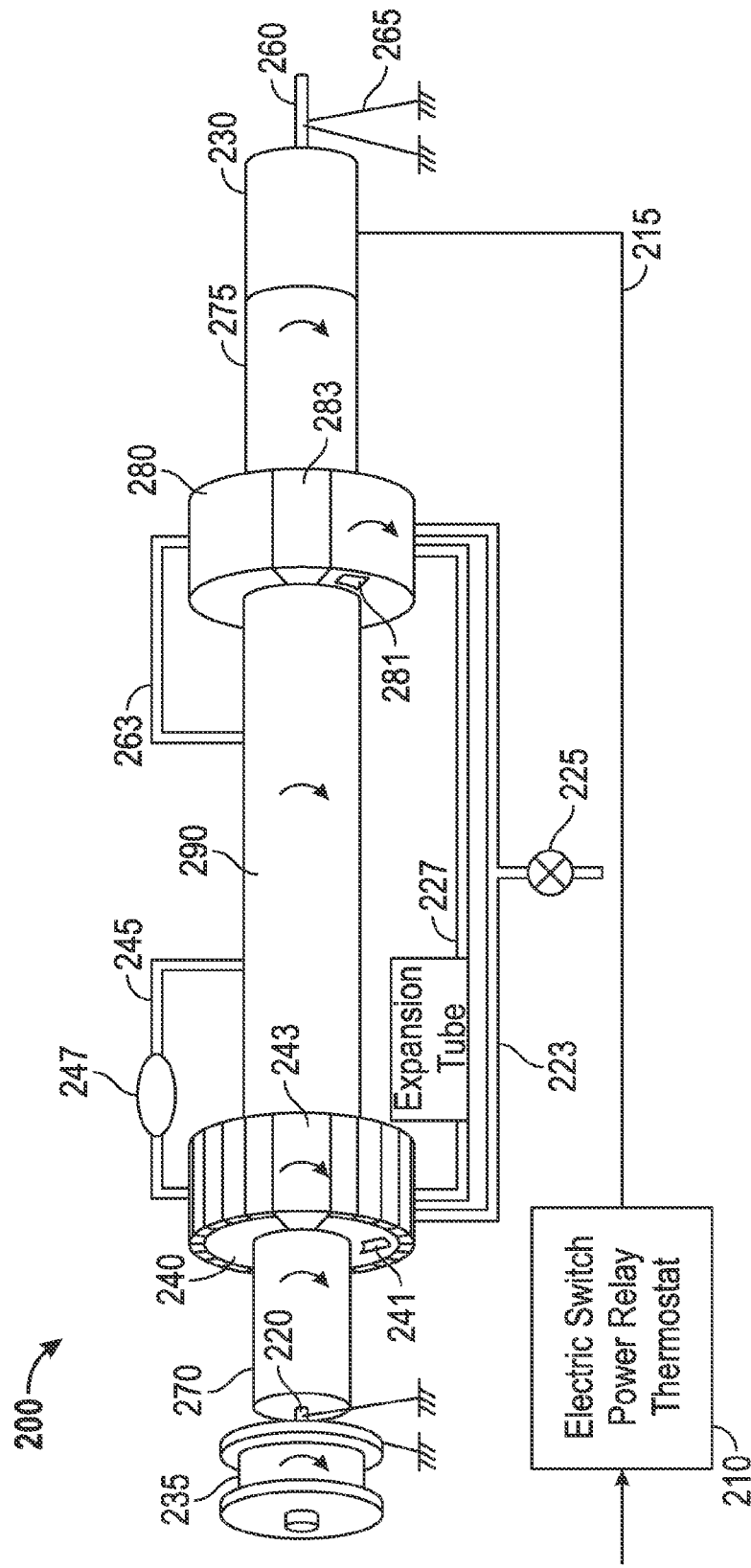
FIG. 2 is a perspective schematic view of an automotive air conditioner system in accord with one possible embodiment of the present invention.

Another embodiment of a rotating air conditioner suitable for automobile applications is schematically depicted in FIG. 2. In this embodiment, rotating air conditioner 200 is driven by motor drive pulley 235 and clutch 230, rather than through the use of an electrical motor as depicted in FIG. 1. Referring to the prior art of FIG. 4, compressor 412 is stationary and clutch 414 rotates compressor shaft 413, but in FIG. 2 compressor 290 is rotated and shaft 260 is held stationary by clutch 230. Clutch 230 is activated by thermostat 210 to turn on compressor 290 for pressurizing the Freon.

As described herein before, compressor 290, condenser 280, and evaporator 240 are radially displaced around central shaft 260 and rotate with central shaft 260. In one embodiment, shaft 260 is supported on one end by fixed support 265 and on the other end by fixed support 220. Fixed supports 220 and 265 keep shaft 260 in a relatively stable position while rotating air conditioner 200 is in operation. Thermostat 210 operates clutch 230 electrically through cable 215. Auto balancers 270, 275 keep an even weight distributed across shaft 260, creating an even, balanced rotation of shaft 260 during operation of air conditioner 200.

In operation, cool liquid Freon travels from condenser 280 through high pressure line 227 to evaporator 240. As the Freon evaporates, cool air is produced and is directed out of the system by the blower within evaporator 240. The Freon moves through coils and fins (See FIG. 5) inside evaporator blower 240 and thereby cools the surrounding air entering through evaporator inlet 241. The Freon expanding causes the liquid Freon to turn to gas. Adjustable outlet duct 243 provides an exit for the cooled air to be directed into the surrounding area for cooling purposes.

The Freon gas is then routed through return line 245, passing through dryer 247 into compressor 290, where the Freon gas is pressurized, increasing the temperature of the gas turning it to a liquid. Dryer 247 not only filters the Freon gas, but may also provide a connection for filling and testing the Freon. After being pressurized, the Freon travels through high pressure line 263 back into condenser 280. Condenser 280 contains condenser coils and fins (See FIG. 6) to cool or extract the collected heat, allowing the gas to emit the heat and condense the Freon back into a liquid form. Air inlet 281 draws ambient air into condenser 280 and adjustable outlet duct 283 directs hot air out of rotating air conditioner 200 to the ambient air. In one embodiment, a hose may be placed on outlet duct 283 to direct the air away from air conditioner 200 and prevent hot air from immediately returning into air inlet 241 of evaporator 240.

Figure 3:
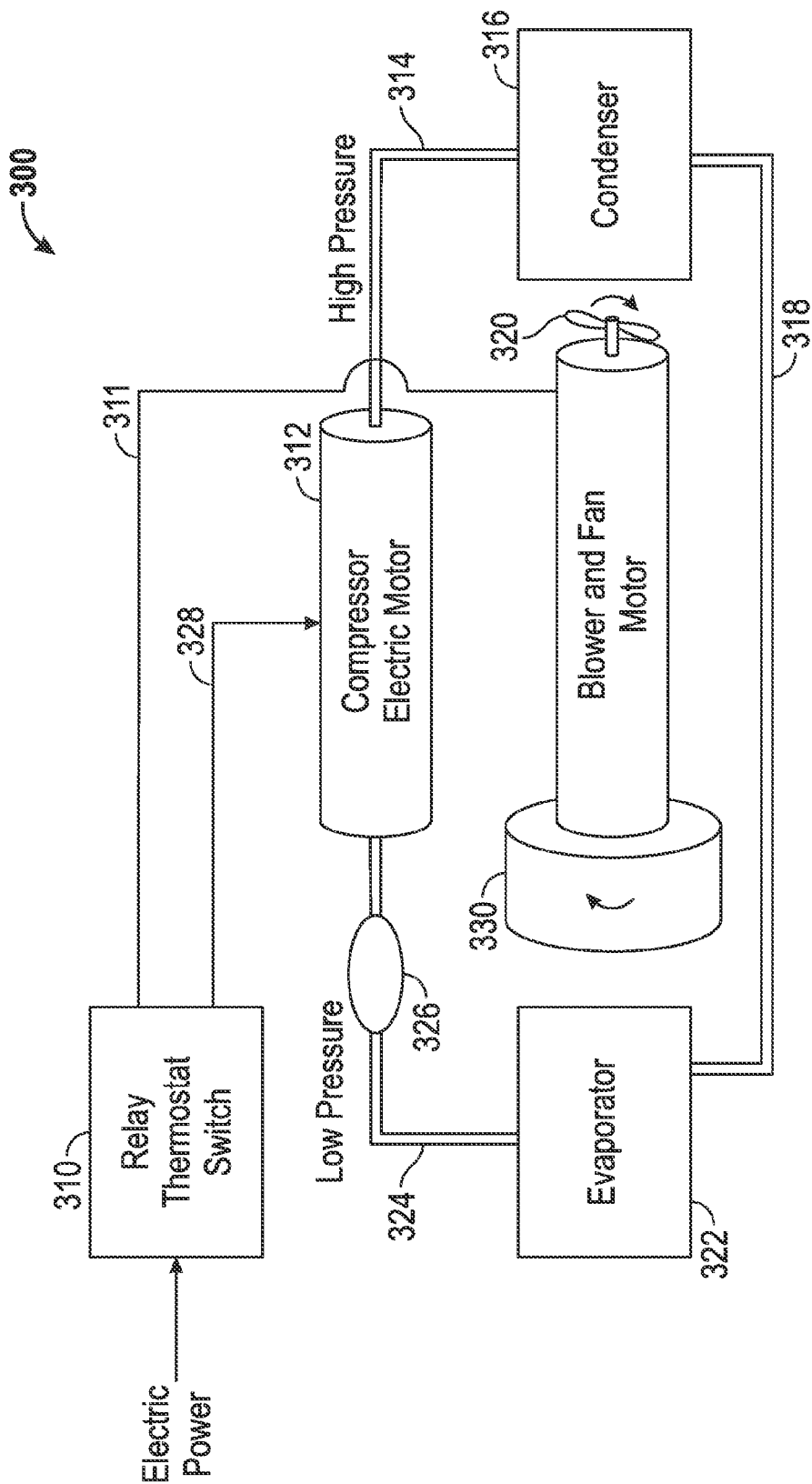
FIG. 3 is a diagram of a prior art window air conditioner system.
Figure 4:
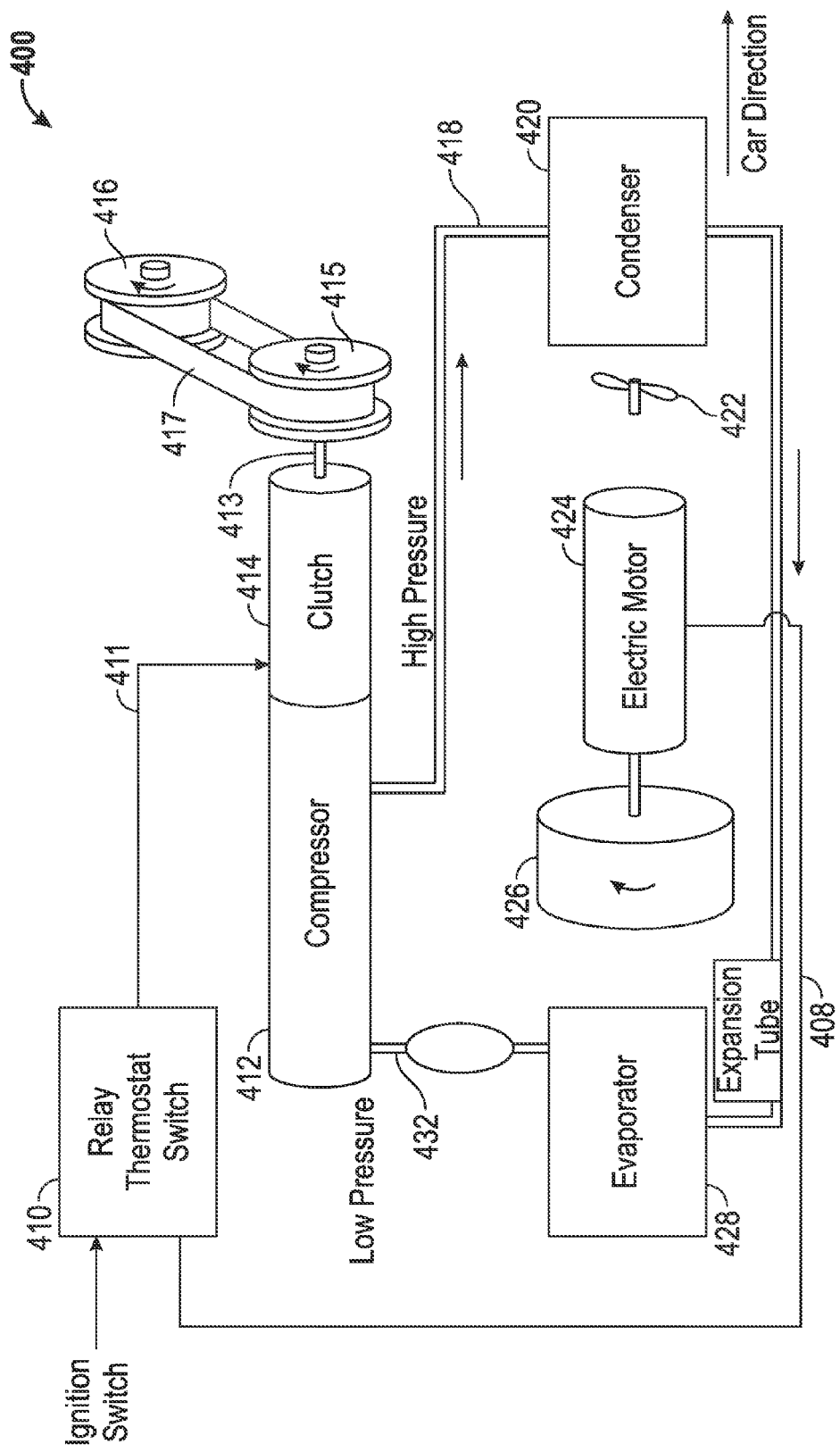
FIG. 4 is a diagram of a prior art automotive air conditioner system.
Figure 8:
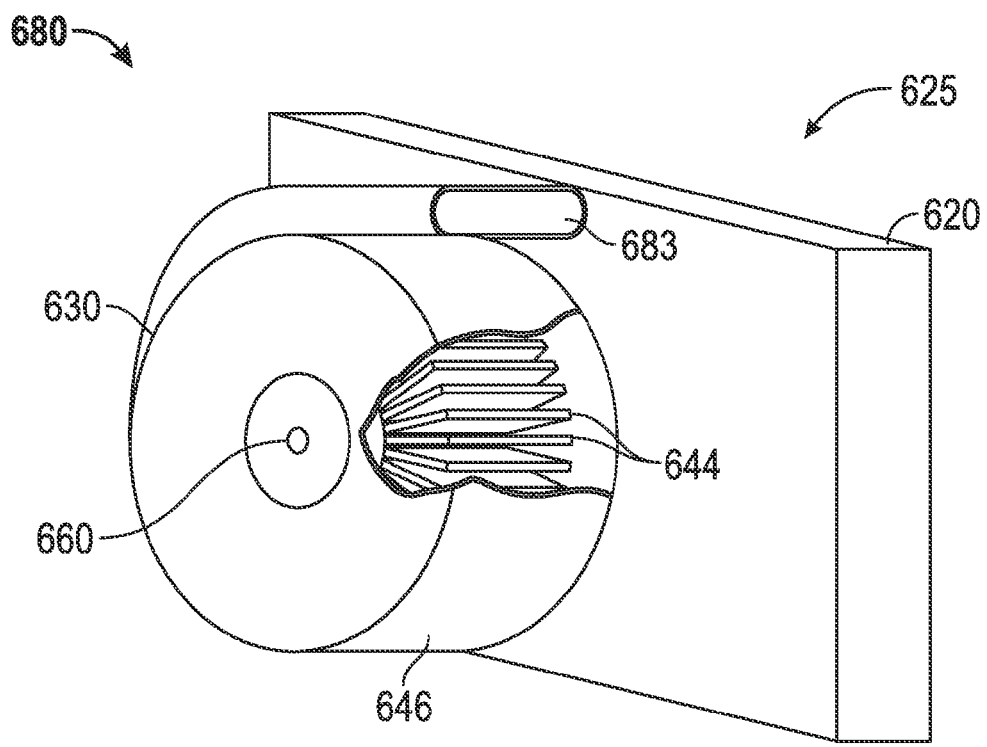
FIG. 8 is perspective view, partially cutaway, of a condenser in accord with one possible embodiment of the present invention.

A rotating air conditioner as taught herein is more efficient than the prior art systems, because considerable more air force is generated with the rotating arrangement of components. The force of air in the prior art described hereinbefore in regards to FIGS. 3, 4, and 8 is equal to the suction or pressure from a blower or fan, which is limited by the laws of fluid flow. Furthermore, the force of air is increased because of the rotating design, and is described by the following equation:

$$\text{Force of Air} = \frac{\text{Mass of Air or Media (Velocity)}^2}{\text{Radius of Rotation}}.$$

The prior art air conditioner systems, as described herein in FIGS. 3 & 4, as well as the present invention are limited by Bernoulli's Equation, where v=velocity of media, h=head on pressure, and g=gravity:

$$\frac{v_1^2}{2g} + h_1 = \frac{v_2^2}{2g} + h_2$$

Looking to FIG. 8, radiator 620 may comprise a prior art radiator operably connected to condenser 680. Rotating air conditioner 100 depends on speed plus regeneration or recirculation, resulting in either colder or hotter heat transfer, depending on the embodiment. Because $v_1=0$, the fixed atmospheric pressure is limited, and larger force is achieved from condenser 680 and output through duct 683.

Figure 5:
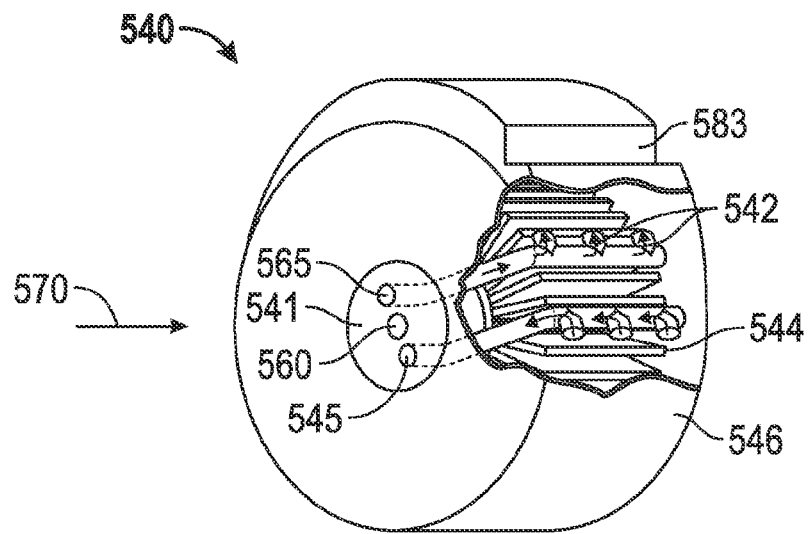
FIG. 5 is a perspective view, partially cutaway, of an evaporator in accord with one embodiment of the present invention.
Figure 7:
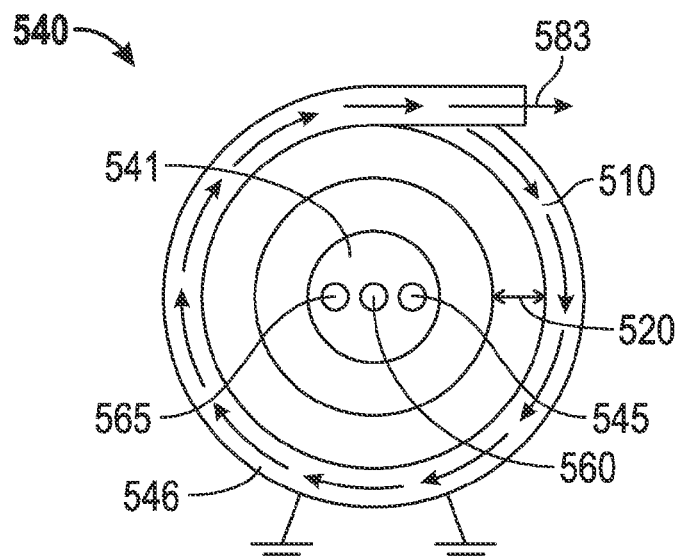
FIG. 7 is a side elevational schematic view of an evaporator in accord with one possible embodiment of the present invention.

Turning now to FIG. 5 and FIG. 7, the components of evaporator 540 and condenser 680 are depicted. Evaporator 540 comprises case or housing 546 which surrounds and isolates the internal components. Freon enters through high pressure line 565 and expands in parallel coils 542 that connect to parallel fluid connections along high pressure line 565, in this embodiment. The parallel coils 542 encircle the housing and connect preferably in parallel as shown to output line 545. It is noted that the parallel coils are shown cut off to better view blades/fins 544 and it will be understood by those of skill in the art that the parallel coils or tubes are continuous between the input 565 and output 545. Input air flow 570 can be directed into evaporator 540 from either side of case 546 but in this configuration enters opening 541 of housing 546. Blower blades/fins 544 apply the ambient airflow from inlet 541 to coils 542 and any additional cooling fins for evaporating the Freon. As a result of operation, evaporator 540 blows cool air through outlet duct 583. Within evaporator 540, the Freon is heated into a hot gas and leaves evaporator 540 by way of low pressure line 545. In one embodiment, housing 546 is in a fixed position which can be selectively reoriented or redirected. Internally, the cooling fins or blower blades 544 are rotated by shaft 560. In one embodiment, several tubes or coils 542 may be connected in parallel within housing 546 such that several tubes or coils expand the Freon in the radiator. In other words, coils 542 can comprise several coils that carry Freon, which is expanded to a gas state in condenser 540. In another embodiment, coils 542 may comprise a continuous coil or tube such as that shown in condenser 680 discussed hereinafter. Thus, the coil configuration and/or cooling fins of either evaporator 540 or condenser 680 is not intended to be limited to a particular configuration.

Figure 6:
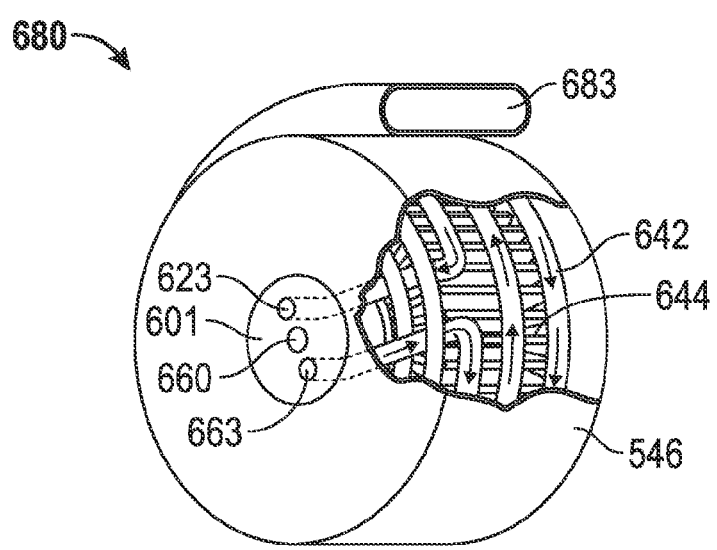
FIG. 6 is a perspective view, partially cutaway, of a condenser blower in accord with one possible embodiment of the present invention.

Referring to FIG. 6 and FIG. 8, condenser 680 receives pressurized Freon gas, at a relatively high temperature, from a compressor by high pressure line 663. The hot Freon gas is cooled by air flow 625 through radiator 620 that then flows through coils 642 and any cooling fins, blades and the like. Fan blades 644 push air through condenser 680, allowing the Freon to dissipate the heat and condense to a cool liquid Freon. The hot air created by running the Freon through condenser 680 is released through outlet duct 683, preferably to a location away from rotating air conditioner 100. In one embodiment, blower coils 642 and fins and/or fan blades 644 rotate around shaft 660 of rotating air conditioner 100. Fan blades 644 may be rotated at a higher speed with a blower motor, which may also rotate with shaft 660. Shaft 660 may be part of or separately controlled for rotation with respect to shaft 560 of evaporator 680. In another embodiment, housing 646 is held stationary and/or can be redirected or selectively positioned as desired. In yet another embodiment, blower coils 642 can comprise one long continuous coil throughout condenser 680 with Freon input 663 and output 623. It will be understood that the coil of condenser 680 is operatively connected with the coils of evaporator 540 as discussed hereinbefore. The coil or coils of condenser 680 may comprise a single long tube or multiple tubes. Accordingly, the rotating air conditioner of the present invention utilizes the heating and cooling of a sufficient liquid, such as Freon, in more efficient rotary evaporators and condensers to provide a more lightweight air conditioner.

FIG. 7 shows an end view of the cool air flow 510 through and out of evaporator 540 in accord with one possible embodiment of the present invention. In this embodiment, blower portion 510 and radiator portion 520 may be combined into a singular unit.

In summary, the present invention provides that components of air conditioners such as a condenser, condenser coil, and condenser refrigerant fluid lines may rotate. If desired a blower motor may be utilized to further force air through the system. Likewise, an evaporator, evaporator coil, and evaporator fluid lines may rotate. In one embodiment, the compressor rotates but in another embodiment, the compressor is non-rotating (with respect to Earth).

The foregoing description of the preferred embodiments of the invention has been presented for purposes of illustration and description only. It is not intended to be exhaustive or to limit the invention to the precise form disclosed; and obviously many modifications and variations are possible in light of the above teaching. Such modifications and variations that may be apparent to a person skilled in the art are intended to be included within the scope of this invention as defined by the accompanying claims.

The invention claimed is:
1. A rotating air conditioner apparatus, comprising:
   at least one elongated shaft;
   a compressor;
   an evaporator, said evaporator comprising an evaporator coil through which a refrigerant flows, said evaporator coil being mounted to said elongated shaft for rotation around said at least one elongated shaft;
   a condenser, said condenser comprising condenser coils through which said refrigerant flows, said condenser coils being mounted to said elongated shaft for rotation around said at least one elongated shaft; and
   a fluid rotary joint for fluidly connecting said compressor with said evaporator and said condenser, said rotary joint comprising a stationary connection on one side and a rotating connection on an opposite side.

2. The rotating air conditioner apparatus of claim 1, said evaporator further comprising a cylindrical evaporator housing, an inlet duct, an outlet duct, and an evaporator blower configured around said at least one elongated shaft.

3. The rotating air conditioner apparatus of claim 1, said condenser further comprising a housing, an inlet air duct, an outlet air duct configured around said at least one elongated shaft.

4. The rotating air conditioner apparatus of claim 1, further comprising a blower motor that rotates around said at least one elongated shaft and further comprising a plurality of electrical slip rings for transferring power to said compressor.

5. The rotating air conditioner apparatus of claim 1, further comprising a motor to rotate said shaft.

6. The rotating air conditioner apparatus of claim 1, further comprising at least two balancing weights placed on opposite sides of said at least one elongated shaft to balance rotational movement during operation of said rotating air conditioner, said at least two balancing weights rotating around said at least one elongated shaft.

7. The rotating air conditioner apparatus of claim 1, wherein said compressor rotates around the axis of said at least one elongated shaft.

8. A rotating air conditioner apparatus, comprising:
   a shaft;
   an evaporator comprising evaporator coils mounted for rotation around said shaft;
   a condenser comprising condenser coils mounted for rotation around said shaft;
   a compressor operable for compressing a refrigerant; and a fluid rotary joint for fluidly connecting said compressor with said evaporator and said condenser, said rotary joint comprising a stationary connection on one side and a rotating connection on an opposite side.

9. The rotating air conditioner apparatus of claim 8, said evaporator further comprising a cylindrical evaporator housing, an evaporator air inlet duct, and an evaporator air outlet duct.

10. The rotating air conditioner apparatus of claim 8, said condenser further comprising a cylindrical housing, a condenser air inlet duct, and a condenser outlet duct.

11. The rotating air conditioner apparatus of claim 8, further comprising a clutch and an electric switch to operate said clutch.

12. The rotating air conditioner apparatus of claim 8, further comprising a pulley mounted to said shaft.

13. A method for a rotating air conditioner apparatus, comprising:
- providing an at least one elongated shaft mounted for rotation;
- providing a compressor;
- providing an evaporator comprising evaporator coils mounted for rotation around said at least one elongated shaft;
- providing a condenser comprising condenser coils mounted for rotation around said at least one elongated shaft; and
- providing a fluid rotary joint for fluidly connecting said compressor with said evaporator and said condenser, said rotary joint comprising a stationary connection on one side and a rotating connection on an opposite side.

14. The method of claim 13, further comprising providing that said evaporator comprises a cylindrical evaporator housing, an evaporator air inlet duct, and an evaporator air outlet duct.

15. The method of claim 13, further comprising providing a blower motor which rotates around said shaft.

16. The method of claim 13, further comprising providing a motor to rotate said at least one elongated shaft.

17. The method of claim 13, further comprising providing at least two balancing weights placed on opposite sides of said at least one elongated shaft to regulate rotational movement of said shaft during operation of said rotating air conditioner.

18. A method for making a rotating air conditioner apparatus, comprising:
- providing at least one elongated shaft mounted for rotation;
- providing a compressor;
- providing an evaporator comprising evaporator coils;
- providing a condenser comprising condenser coils;
- providing that at least one of said evaporator coils or said condenser coils are mounted for rotation around said at least one elongated shaft;
- providing a fluid rotary joint for fluidly connecting said compressor with said evaporator and said condenser, and
- providing that said rotary joint comprises a stationary connection on one side and a rotating connection on an opposite side.

* * * * *